Nov. 29, 1966 C. T. PATTERSON 3,288,448
GAS DEHYDRATOR

Filed March 8, 1966 3 Sheets-Sheet 1

INVENTORS
CHARLES T. PATTERSON
CHARLES O. MEYERS
BY
Arthur L. Wade
ATTORNEY

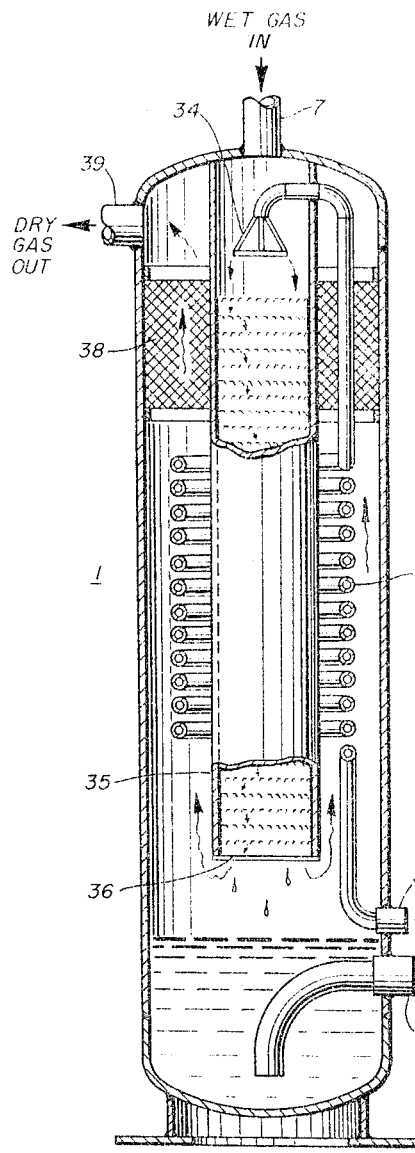
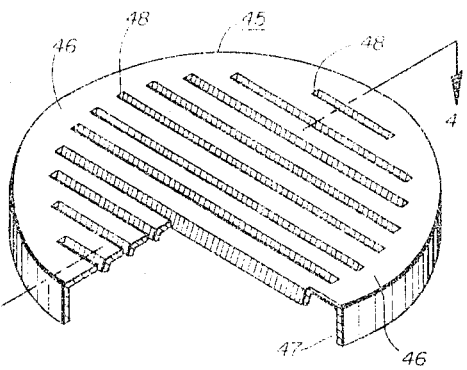
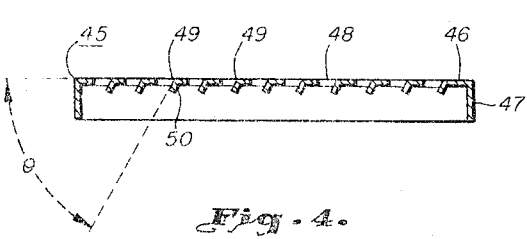
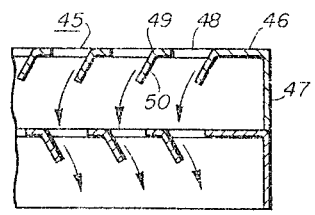

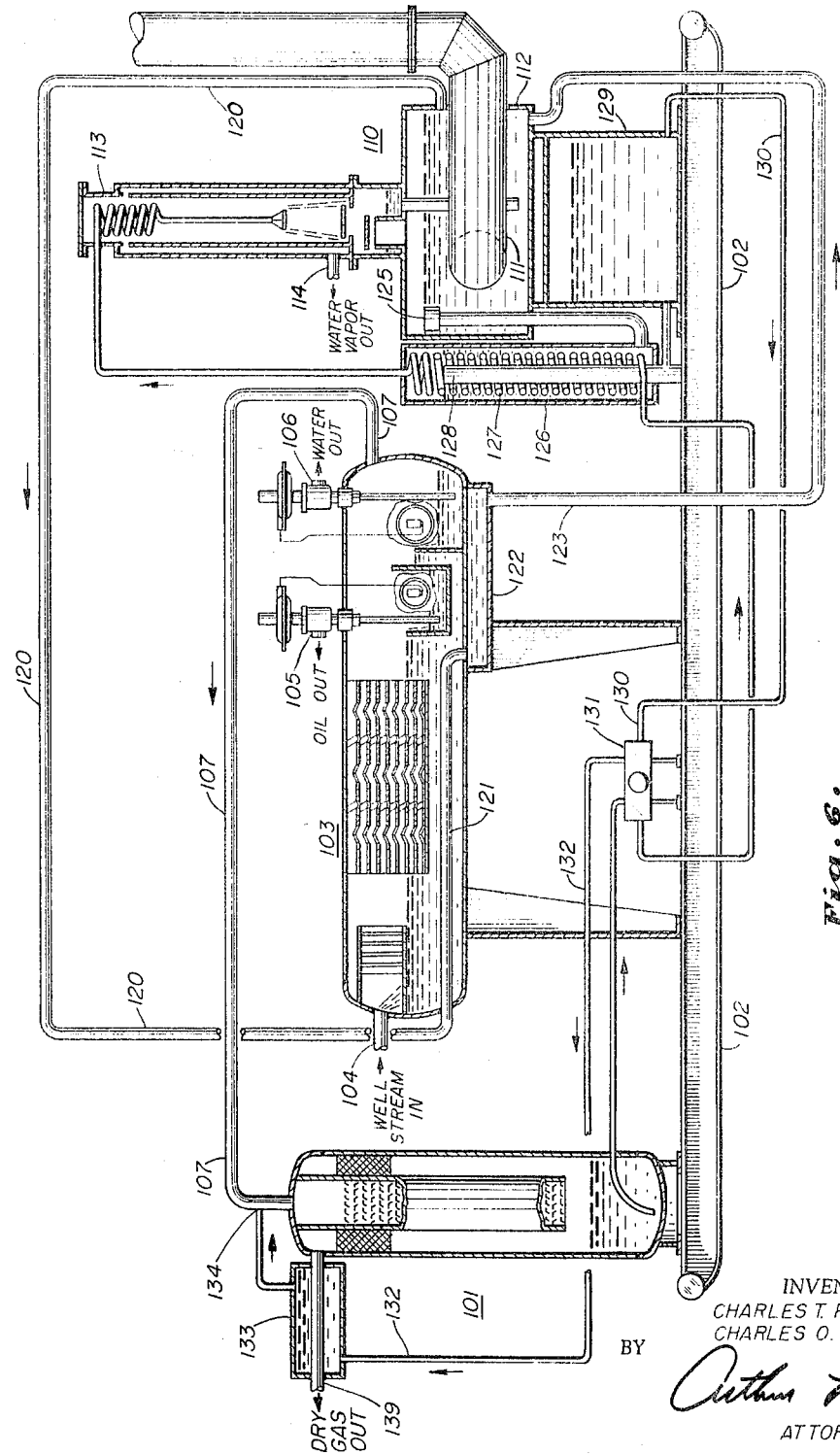

United States Patent Office 3,288,448
Patented Nov. 29, 1966

3,288,448
GAS DEHYDRATOR
Charles T. Patterson and Charles O. Meyers, Tulsa, Okla., assignors to Combustion Engineering, Inc., New York, N.Y., a corporation of Delaware
Filed Mar. 8, 1966, Ser. No. 532,658
3 Claims. (Cl. 261—152)

This application is a continuation-in-part of our pending application Serial No. 227,432, filed October 1, 1962.

The present invention relates to the contact of liquid desiccant with gas to be dehydrated. More particularly, the invention relates to the exposure of the surfaces of the liquid desiccant and gas to each other.

The invention is generally concerned with dehydrators for natural gas in which a liquid desiccant, such as glycol, is employed. The invention is particularly concerned with the absorber, or liquid-gas contactor, of a dehydrator in which water is removed from the natural gas with the desiccant.

It is a general object of the liquid-contactor to bring a body of liquid desiccant with a relatively low water vapor pressure into intimate contact with the stream of natural gas to be dehydrated. The two streams flow through the contactor continuously, the desiccant absorbing water from the gas stream to reduce the water vapor dew point of the gas stream. The desiccant, which has absorbed water, and hence has an increased water vapor pressure, is circulated through a reconcentrator wherein the absorbed water is removed, or separated, from the desiccant. The reconcentrated desiccant is then returned to the contactor enclosure for absorption of moisture from further quantities of gas. These systems are intended to be continuous in operation, the gas stream passing constantly through the contactor structure to be dehydrated therein while the desiccant flows in a closed cycle through the contactor to absorb water and through the reconcentrator wherein the absorbed water is removed from the desiccant.

The dew point depression obtained by the use of liquid desiccant is dependent upon several variables. An important variable is the differential between the water vapor pressure of the natural gas to be dehydrated and the water vapor pressure of the liquid desiccant brought into intimate contact with the gas in the absorber vessel. The differential between these two vapor pressures is a force which drives the water from the natural gas and into the liquid desiccant. The higher the differential maintained between the vapor pressures, the greater the final depression of the dew point of the gas.

Another variable on which dew point depression depends is the degree of intimacy with which liquid desiccant and wet natural gas are brought together for applying the driving force of the differential between the water vapor pressures. It has been common to mount bubble caps on trays over which liquid desiccant is flooded. The gas is forced up through the bubble caps which have a configuration which is intended to intimately mix the gas in the liquid desiccant.

One fundamental defect in the bubble cap-tray structure is in the fact that the liquid desiccant is flowed horizontally across the tray while the gas to be dehydrated is moved uniformly transverse the flow path of the liquid desiccant. This obviously results in a progressive enrichment of the desiccant with water vapor while contacting gas of uniform water vapor pressure. The result is a gradient of effectiveness across the tray.

Another defect of the bubble cap-tray structure is the tendency of the bubble size of gas release beneath the liquid desiccant surface to be controlled by the viscosity of the liquid desiccant, the speed of the gas in its travel, or some function which is independent of the configuration of the bubble cap. Regardless of the shape of the cap, the gas bubbles remain about the same size.

Another defect in the bubble cap-tray structure is the inherent difficulty in avoiding "dead spots" or inactive collections of the desiccant on the tray. The enriching desiccant often stratifies and water collects in the tray areas. It is difficult to design a tray, with caps mounted thereon, over which the desiccant will flow dynamically and maintain uniformity.

Another basic limitation in the bubble cap-tray structure is the inherently short length of time available for contact between the surface of the liquid desiccant and the gas. As gas is released beneath the surface of the desiccant, its time of contact is the time it takes that bubble to reach the surface of the liquid desiccant. This is a serious limitation on the effectiveness of the force available to drive the water from the gas and into the desiccant.

The principal object of the present invention is to increase the area of the liquid desiccant exposed to gas to be dehydrated and the time of that exposure.

A more particular object of the invention is to mechanically manipulate the liquid desiccant by spreading, and re-spreading, the body of the desiccant into a thin sheet of the liquid so its surface contacted by the gas to be dehydrated will continually expose the less dilute portions of the desiccant to the gas and thereby promote maintenance of the greatest differential possible between the water vapor pressures of the gas and desiccant.

The invention contemplates a spreader structure for liquid desiccant with which the desiccant is spread in a thin sheet for exposure to gas to be dehydrated. The gas and desiccant are caused to pass over the spreader structure in the same direction, while exposed to each other, for a period which will give the differential in water pressure full opportunity to drive water from the gas.

The invention further contemplates the spreader structure providing a series of surfaces for the liquid desiccant with which the direction of spreading is changed to spread, and re-spread, the desiccant and thereby bring the less dilute portions of the desiccant to the re-spread surface of the desiccant. While the desiccant is being mechanically manipulated by the surfaces, the gas and re-spread desiccant are parallel to each other to give the full time of exposure available within the spatial limits of the structure providing the two paths.

Other objects, advantages and features of this invention will become apparent to one skilled in the art upon consideration of the written specification, appended claims and attached drawings, wherein:

FIG. 2 is a sectioned elevation of the absorber vessel in which the re-spreading trays are mounted;

FIG. 3 is a partially sectioned perspective of a single re-spreader tray;

FIG. 4 is a sectioned elevation of the re-spreader tray of FIG. 3 along lines 4—4;

FIG. 5 is a sectioned elevation of a portion of two re-spreader trays as positioned in the absorber; and FIG. 6 is a sectioned elevation of the components of another glycol dehydrator system similar to that of FIG. 1 but with a different arrangement for introducing the lean glycol into the absorber vessel.

FIG. 1 shows the components of a glycol dehydrator system as physically oriented on a base skid. The basic process of the system centers in and about absorber 1 which is in the form of a vertical cylindrical tank mounted near one end (left) of skid structure 2.

Gas to be dehydrated

Figure 1:
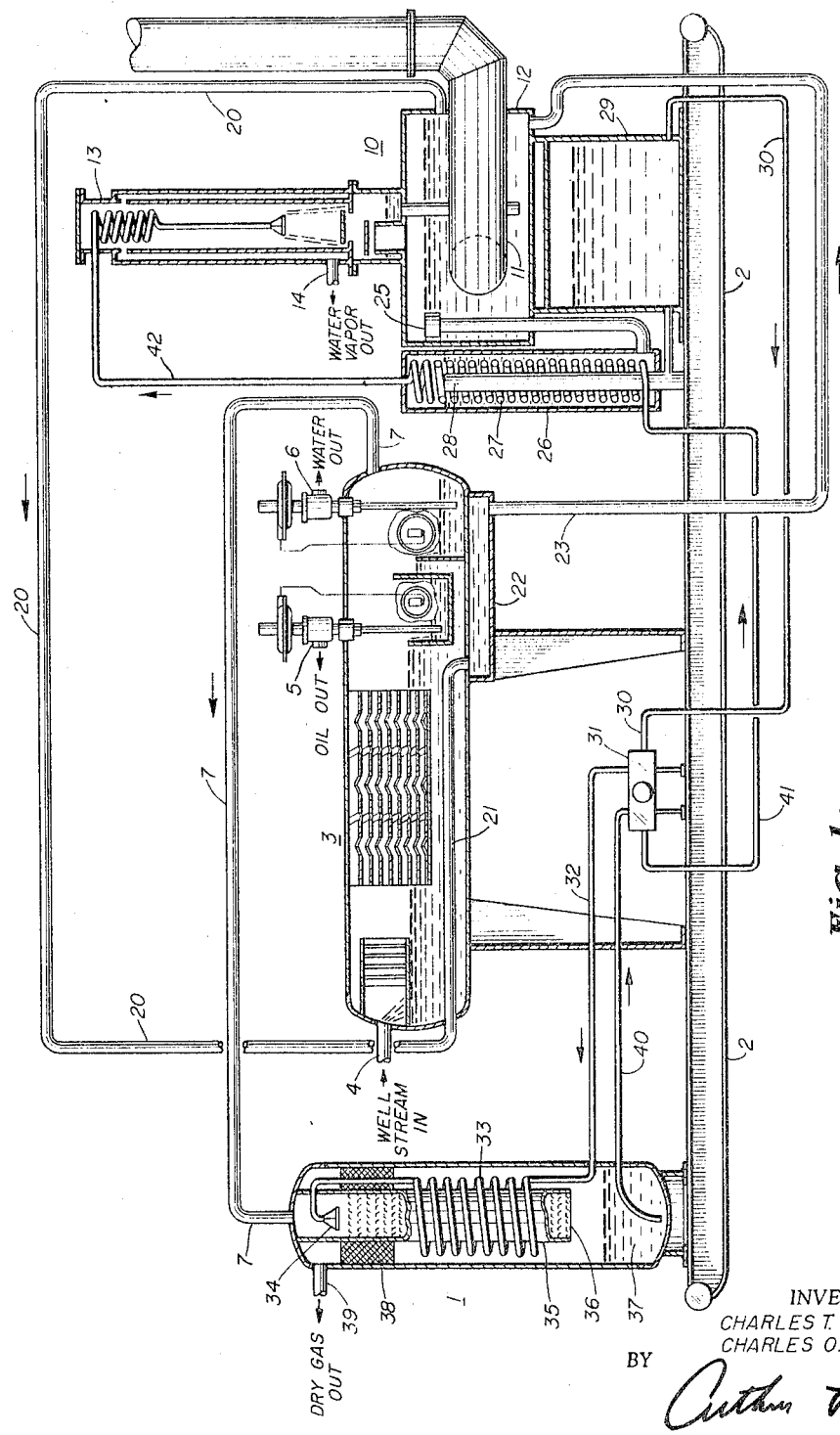
FIG. 1 is a sectioned elevation of the components of the glycol dehydrator system embodying the present invention.

Absorber 1 receives gas from any source supplying gas which requires dehydration. Separator 3 is only illustrative of any number of sources for gas in need of this type of processing. Separator 3 is illustrated as receiving a well stream through inlet conduit 4 and dividing the well stream into three phases. The oil phase is collected in a compartment within the shell of separator 3 and withdrawn through valve 5. Water is also collected within a separate compartment and withdrawn through valve 6. The gas needing dehydration is withdrawn through conduit 7 and passed to the top of absorber 1.

Desiccant reconcentration

A reconcentrator unit 10 is disclosed at the right end of skid 2. Reconcentrator unit 10 has a heat source 11 with which water is boiled from the liquid desiccant in compartment 12. The desiccant to be reconcentrated is passed downwardly through reflux column 13 and the water vapor boiled therefrom is passed out conduit 14.

Desiccant heat

*Thermosiphon.*—The reconcentrated desiccant should have its temperature lowered as much as possible. The cooler the desiccant, the more effectively it will remove water vapor from gas it contacts. The present disclosure illustrates in a general way how the heat of the boiling desiccant is first made immediately available to warm the separated liquids within separator 3 as may be required to keep separator 3 operating properly. The heated desiccant rises up through conduit 20 and passes into the shell of separator 3 through a heat exchange conduit 21. Within heat exchange conduit 21 the reconcentrated desiccant gives up its heat to the liquids of separator 3, passes down into compartment 22 and down conduit 23 for return to the bottom of compartment 12. This continuous circulation of the liquid desiccant is carried out under the force of thermosiphonic action.

*First temperature reduction.*—As the level of reconcentrated, hot, desiccant reaches the top of weir conduit 25, the desiccant passes down conduit 25 and into a liquid-liquid heat exchanger 26. The hot, reconcentrated desiccant passes up over coils 27 and down overflow pipe 28 to pass into a reservoir compartment 29. This reconcentrated desiccant, is initially cooled within heat exchanger 26, is then taken by conduit 30 to the absorber 1 by pump 31. Specifically, conduit 32 transports the liquid desiccant into absorber 1, through coils 33 and discharges this liquid desiccant from a nozzle structure 34, positioned within the top of absorber 1.

*Second temperature reduction.*—Within absorber 1, gas to be dehydrated and reconcentrated desiccant are placed in concurrent flow paths through inner shell 35. Inner shell 35 is attached to the top head of absorber 1 and is open at its bottom 36 to discharge both the liquid desiccant and dehydrated gas. The liquid desiccant forms a body 37 in the bottom of absorber 1 while the dehydrated gas then flows upward through the annulus between inner shell 35 and the internal wall of absorber 1. Coils 33, carrying reconcentrated desiccant from pump 31, are positioned within this annulus and a liquid-gas heat exchange takes place to give the liquid desiccant its lowest temperature just prior to concurrent flow with the gas to be dehydrated.

Gas and desiccant in absorber 1

The dehydrated gas continues to flow up the annulus of absorber 1, over coils 33 and through mist-extractor 38 to outlet conduit 39. The liquid desiccant, now rich with water absorbed from the gas, is removed from shell 1 through conduit 40 by pump 31 and forced through conduit 41, through coils 27 in heat exchanger 26, up through conduit 42 and down reflux column 13 to be again reconcentrated in unit 10.

FIG. 2 provides a more detailed disclosure of the structure of absorber 1. The general flow pattern through absorber 1 is clear from the examination of FIG. 1. In FIG. 2, the section through inner shell 35 is made complete in order to disclose the spreader structure mounted within inner shell 35 in more detail.

In review, the gas to be dehydrated is brought into the top of absorber 1 by conduit 7. More specifically, the gas to be dehydrated is placed in the common space at the top of inner shell 35 which depends concentrically from the top head of absorber 1 and extends through a substantial portion of the total length of absorber 1.

The liquid desiccant to be brought into intimate contact with the gas to be dehydrated comes into absorber 1 through conduit 32. Passed up through coils 33, the liquid desiccant is discharged by nozzle 34 with the gas discharging from conduit 7, both being thus placed in the same space at the top of shell 35. Various configurations of nozzle 34 can be used to satisfactorily disperse the lean desiccant uniformly across the cross-section of inner shell 35. With this means the desiccant is brought into initial uniform association with the gas to be dehydrated.

After the liquid desiccant is initially distributed over the cross-section of inner shell 35, it is passed down through a series of trays which are given a particular configuration to spread, and re-spread, the liquid in providing a large surface area of the liquid to the gas to be dehydrated. A series of trays comprise this spreader structure. Each of the trays have parallel slots across their surfaces, each slot having a louver portion depending from one side of the slot at a fixed angle. The liquid desiccant passes through these slots, a portion of the total liquid spreading out upon the louver of each slot to travel downwardly at the angle at which the louver is attached to the slot edge. The trays are identical, but every other tray is rotated 180 degrees from its adjacent tray so the downward path of the liquid desiccant is made tortuous. The louvers of the trays thereby provide a mechanical manipulation which spreads, and re-spreads, the desiccant to continually bring the less dilute portions of the desiccant to the surface of the gas which travels in concurrent flow with the desiccant down inner shell 35.

FIG. 2 illustrates that quite a number of the tray structures are vertically stacked within inner shell 35. The "reversal" of the louver direction as the desiccant flow progresses from one tray to the next takes place a great many times as the desiccant and gas travel through this assemblage of trays. Concurrent flow of gas to be dehydrated and the liquid desiccant, through this spreader structure within inner shell 35, provides the maximum opportunity for the driving force of the differential of water vapor pressures to dehydrate the gas within the physical limitation of the absorber structure.

This intimacy of exposure between desiccant and gas to be dehydrated is unparalleled in the contactor art. No bubble cap tray combination of comparable complexity is available in the art as now practiced. This combination of concurrent flow, spreading and re-spreading the liquid desiccant, and the length provided for these two paths, gives a surprising, unexpected result in obtaining dew point depression of the processed gas. The inner shell 35 is completely filled with the two fluids moving continuously and dynamically together. There are no prospective "dead spots" for dilute desiccant to hang up in. Both streams are moved together, the liquid desiccant continually manipulated by the spreader to promote the required exposure of gas to desiccant.

FIG. 3 is used to show one of the trays of inner shell 35 in further detail. One of the overall objects of the tray design is to keep the stack of them in shell 35 from creating a high pressure drop in the flow of fluids through shell 35. Another object of their design is for them to fit in cylindrical shell 35 so liquid desiccant will not by-pass around the edges of the tray. More specifically, of course, each tray is to spread the desiccant in a thin sheet to give the contact area needed for the gas.

The overall configuration of the tray 45 could be compared to the traditional shape of a coffee can lid. A flat surface 46 has a rim 47 drawn from its circular edge. This rim 47 slides along the inner wall of shell 35 and comes to rest on the face of the adjacent tray which is positioned below.

In the flat surface 46 a series of parallel slots 48 are formed to receive the liquid desiccant. Each slot 48 is parallel to the other slots and extends to within a common predetermined distance of the circular edge of surface 46. Taken together, the slots form the passageway for the desiccant through the tray. FIG. 3 is the initial disclosure of the diverting and spreading structure attached to each slot. FIG. 4 discloses this structure further.

FIG. 4, more specifically, discloses how each slot 48 has a louver attached to one edge. The material of surface 46 is, itself, bent along line 49 uniformly at a fixed angle to form the louver. The resulting louver 50 receives the desiccant as the desiccant discharge through slot 48 and spreads and diverts this portion of the desiccant. More specifically, the desiccant starts to flow through slot 48 in a direction axial with the inner shell 35, or normal to the plane of surface 46. When the liquid strikes the surface of louver 50 it spreads in a thin sheet thereon and is thereafter caused to flow along the louver at the angle at which the louver is bent from line 49.

FIG. 5 discloses further how the trays 45 are stacked so the liquid desiccant from an upper louver will be received by a lower louver, the lower louver angled as the upper louver, but in the opposite direction across the axis of the inner shell. Arrows are used to show the profile of the path taken by the desiccant flowing downward through two or more trays. Each time the desiccant strikes a lower louver it is re-spread, bringing fresher desiccant to the re-spread surface. The gas, passing in concurrent flow through the slots 48, is thereby being constantly contacted by the strongest desiccant to remove water from the gas.

*Actual reduction to practice*

In first reducing the invention to practice, a rather specific range was considered for the gas to be dehydrated. The gas wells in the Farmington Area of New Mexico, produced by the El Paso Natural Gas Company, were considered in their requirements. A 50 degree dew point depression was set as a goal, putting as little pressure drop in the system as possible.

Test block work at National Tank Company, Tulsa, Oklahoma, indicated that a two million cubic feet per day gas stream could be passed through an inner shell having a six inch diameter and a three foot length. Only ten pounds per square inch drop through the inner shell would result if about fifty trays were stacked in the shell with five-eighths of an inch height to the rim of each tray. The angle of the louvers was found satisfactory at about 38 degrees. The width of the louvers was satisfactory at five-sixteenths of an inch. This structural balance of shell-tray diameter, distance between trays, louver width and louver angle kept the pressure drop acceptable and the depression obtainable with a glycol rate set at five gallons for each pound of water removed.

Larger sizes of inner shells are visualized for larger streams. Eight inch and ten inch diameters are being studied for establishing a complete line of dehydrating units to implement the basic structure embodying the invention. The small units have proved very satisfactory to the user and the advantages of the invention are being widely recognized.

*FIG. 6*

In continuation of the foregoing disclosure, FIG. 6 illustrates structure generally similar to that of FIG. 1 with an alternate point of injection for the lean glycol into the gas from the separator and an alternate arrangement for heat exchange between the lean glycol and the dehydrated gas.

As in FIG. 1, the basic process centers about an absorber 101 on skid 102. Separator 103 receives a well stream through inlet conduit 104 and divides the stream into three phases. Oil is withdrawn through valve 105 and water is withdrawn through 106. The gas to be dehydrated is withdrawn through conduit 107 and passed to absorber 101.

Reconcentrator 110 has a heat source 111 which boils water from the liquid desiccant in compartment 112. The rich desiccant is passed downwardly through reflux column 113 and the water vapor passed out conduit 114.

The heated desiccant rises up through conduit 120 and heat exchange conduit 121. The heat of the desiccant is given up to the liquids of separator 103, and the desiccant passes down into compartment 122 and down conduit 123 for return to the bottom of compartment 112.

When the level of the reconcentrated desiccant reaches the top of weir conduit 125, the desiccant passes down conduit 125 and into liquid heat exchanger 126. The hot desiccant passes up over coils 127 and down pipe 128 and into compartment 129. The reconcentrated desiccant is thereby given an initial cooling in heat exchanger 126 and is conducted by conduit 130 to pump 131. From pump 131, conduit 132 connects the desiccant to a second temperature reduction and to dehydration of the gas of conduit 107.

In FIG. 1 coils 33 were formed of conduit 32 and placed in the dehydrated gas flow stream within absorber 1. The desiccant was then injected into the top of inner shell 35. In FIG. 6 the cooling of the desiccant in conduit 132 is carried out by heat exchange with the dehydrated gas, but in a structure external absorber 101. Also, the desiccant is injected into the gas upstream of absorber 101. Thus it is illustrated that the present invention does not require heat exchange and desiccant injection with the specific structural arrangements of FIG. 1.

Heat exchanger 133 is shown in FIG. 6, receiving the fluid streams of conduit 132 and 139. The result is the same as with the arrangement of FIG. 1; the desiccant is cooled to the level at which it will effectively dehydrate the gas of conduit 107.

From the exchanger 133, the cooled desiccant is injected into conduit 107 at 134. Thus it is illustrated that provision need not be made to inject desiccant into the top of absorber shell 35, the desiccant can be simply injected into a point upstream of absorber 101 to begin the mixing desirable for effective dehydration.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. In a liquid desiccant dehydrating system for natural gas, an absorber vessel including;
    an outer hollow cylindrical vessel shell vertically extended, said outer vessel having a vertical cylindrical sidewall, a top wall, a bottom wall and a vertical axis;

an inner hollow cylindrical shell having an upper end, a lower end, a vertical cylindrical wall, and a vertical axis, said inner shell coaxial with the outer vessel shell and extended within and spaced apart from the vertical wall of the outer vessel shell and attached to the top wall of the outer vessel shell and depending downwardly in the outer vessel shell with the lower end of the inner shell spaced apart from the bottom wall of the outer vessel shell, the lower end open to the interior of the outer vessel shell, the inner shell and outer vessel shell defining an annulus therebetween at the upper end of the inner shell;

a first input conduit connected to the top of the outer vessel shell and having a discharge end communicating with the interior of the upper portion of the inner shell to introduce gas to be dehydrated into the inner shell;

a source of gas to be dehydrated, the source communicating with said first conduit;

a second input conduit for liquid desiccant communicating with the interior of the upper end of the inner shell;

a source of liquid desiccant, the source of liquid desiccant communicating with the second conduit;

a first tray mounted in the inner shell below the discharge end of the first input conduit;

the first tray comprising a flat plate having a flat surface normal to the vertical axis of the inner shell, a plurality of parallel and elongated substantially equal width slots through the plate and surface and the slots extending across a substantial portion of the surface, the slots defined by the edges of a first plurality of parallel substantially equal width web portions, and a louver attached to a corresponding edge of each web portion and depending downwardly from said surface at a common fixed angle to the surface, the louvers disposed parallel to each other and equidistantly apart;

a second tray mounted in the inner shell adjacent, spaced apart from, and below the first tray;

the first tray and the second tray being identical;

the second tray rotated 180° in a plane normal to the vertical axis of the inner shell so that the louvers attached to the second tray extend downwardly in an opposite direction from the louvers attached to the first tray, whereby fluids passing through the slots spread over the louvers attached to the first tray and then descend to re-spread over the louvers attached to the second tray;

a first output conduit for dehydrated gas connected to the upper portion of the outer vessel shell vertical cylindrical wall to communicate with the annulus formed between the inner and outer shell to remove dehydrated gas from the outer vessel shell;

and a second output conduit for rich desiccant connected to the lower portion of the outer vessel shell, the second output conduit communicating with the lower portion of the interior of the outer vessel shell to remove the rich desiccant from the outer vessel shell.

2. The system of claim 1 including, a heat exchanger connected to the first output conduit for dehydrated gas and the second input conduit for liquid desiccant to reduce the temperature of the desiccant prior to injection of the desiccant into the interior of the upper end of the inner shell.

3. In a liquid desiccant dehydrating system for natural gas, an absorber vessel including;

an outer hollow cylindrical vessel shell vertically extended, said outer vessel having a vertical cylindrical sidewall, a top wall, a bottom wall and a vertical axis;

an inner hollow cylindrical shell having an upper end, a lower end, a vertical cylindrical wall, and a vertical axis, said inner shell coaxial with the outer vessel shell and extended within and spaced apart from the vertical wall of the outer vessel shell and attached to the top wall of the outer vessel shell and depending downwardly in the outer vessel shell with the lower end of the inner shell spaced apart from the bottom wall of the outer vessel shell, the lower end open to the interior of the outer vessel shell;

the inner shell and outer vessel shell defining an annulus therebetween at the upper end of the inner shell;

a first input conduit connected to the top of the outer vessel shell and having a discharge end communicating with the interior of the upper portion of the inner shell to introduce gas to be dehydrated into the inner shell;

a source of gas to be dehydrated, the source communicating with said first conduit;

a second input conduit for liquid desiccant connected to and extending through the outer vessel shell vertical side wall adjacent the outer vessel shell bottom wall and having a discharge end communicating through the inner shell vertical wall at a point adjacent the upper end of the inner shell with the interior of the upper end of the inner shell, the discharge end of the second conduit disposed at a point below the discharge end of the first conduit to introduce liquid desiccant into the inner shell said second conduit coiled about the exterior of the inner shell vertical wall in a plurality of turns so that the dehydrated gas passes over the coiled portion of the second conduit as dehydrated gas flows to the absorber vessel dehydrated gas output conduit;

a source of liquid desiccant, the source of liquid desiccant communicating with the second conduit;

a first tray mounted in the inner shell below the discharge end of the second input conduit;

the first tray comprising a flat plate having a flat surface normal to the vertical axis of the inner shell, a plurality of parallel and elongated substantially equal width slots through the plate and surface and the slots extending across a substantial portion of the surface, the slots defined by the edges of a first plurality of parallel substantially equal width web portions, and a louver attached to a corresponding edge of each web portion and depending downwardly from said surface at a common fixed angle of substantially thirty-eight degrees to the surface, the louvers disposed parallel to each other and equidistantly apart;

a second tray mounted in the inner shell adjacent, spaced apart from, and below the first tray;

the first tray and the second tray being identical;

the second tray rotated 180° in a plane normal to the vertical axis of the inner shell so that the louvers attached to the second tray extend downwardly in an opposite direction from the louvers attached to the first tray, whereby fluids passing through the slots spread over the louvers attached to the first tray and then descend to re-spread over the louvers attached to the second tray;

a first output conduit for dehydrated gas connected to the upper portion of the outer vessel shell vertical cylindrical wall adjacent the top of the outer vessel shell and the output conduit communicating with the annulus formed between the inner and outer shell to remove dehydrated gas from the outer vessel shell;

and a second output conduit for rich desiccant connected to the lower portion of the outer vessel shell vertical wall adjacent the outer vessel shell bottom, the second output conduit communicating with the lower portion of the interior of the outer vessel shell to remove the rich desiccant from the outer vessel shell.

References Cited by the Examiner

UNITED STATES PATENTS

| | | | |
|---|---|---|---|
| 293,622 | 2/1884 | Berkshire | 261—113 XR |
| 1,072,133 | 9/1913 | Lyle | 261—161 |
| 1,169,766 | 2/1916 | Brassert | 261—111 |
| 1,777,843 | 10/1930 | Glisci | 261—161 XR |
| 2,012,962 | 9/1935 | Hagar | 55—259 XR |
| 2,541,757 | 2/1951 | Grier | 261—111 XR |

FOREIGN PATENTS

| | | |
|---|---|---|
| 13,148 | 11/1896 | Switzerland. |
| 125,424 | 4/1928 | Switzerland. |

HARRY B. THORNTON, *Primary Examiner.*

E. H. RENNER, *Assistant Examiner.*